United States Patent [19]
Sasaki et al.

[11] Patent Number: 5,139,988
[45] Date of Patent: Aug. 18, 1992

[54] IRON-ANTIMONY-CONTAINING METAL OXIDE CATALYST COMPOSITION AND PROCESS FOR PRODUCING THE SAME

[75] Inventors: Yutaka Sasaki; Hiroshi Utsumi; Kenichi Miyaki, all of Kanagawa, Japan

[73] Assignee: Nitto Chemical Industry Co., Ltd., Tokyo, Japan

[21] Appl. No.: 761,079

[22] Filed: Sep. 17, 1991

[30] Foreign Application Priority Data

Sep. 18, 1990 [JP] Japan .................................. 2-246305

[51] Int. Cl.[5] .................. B01J 23/78; B01J 23/80; B01J 23/82; B01J 23/84
[52] U.S. Cl. ...................... 502/206; 502/204; 502/207; 502/246; 502/247; 502/248; 502/249; 502/311; 502/312; 502/316; 502/338; 502/209; 502/215; 502/303; 502/304; 502/306; 502/307; 502/308; 502/309; 502/310

[58] Field of Search .............. 502/204, 206, 207, 246, 502/247, 248, 249, 311, 312, 316, 338, 209, 215, 303, 304, 306, 307, 308, 309, 310

[56] References Cited

U.S. PATENT DOCUMENTS

| | | | |
|---|---|---|---|
| 3,591,620 | 7/1971 | Yoshino et al. | 502/207 X |
| 3,657,155 | 4/1972 | Yoshino et al. | 502/241 X |
| 3,988,359 | 10/1976 | Saito et al. | 502/207 X |
| 4,410,450 | 10/1983 | Sasaki et al. | 502/22 |

*Primary Examiner*—W. J. Shine
*Assistant Examiner*—Douglas J. McGinty
*Attorney, Agent, or Firm*—Sughrue, Mion, Zinn Macpeak & Seas

[57] ABSTRACT

A composition which contains as essential components: crystalline iron antimonate and at least one element selected from the group consisting of vanadium, molybdenum, and tungsten; is useful as a catalyst in the oxidation reaction of organic compounds. Also, a process for producing the composition is disclosed.

11 Claims, No Drawings

IRON-ANTIMONY-CONTAINING METAL OXIDE CATALYST COMPOSITION AND PROCESS FOR PRODUCING THE SAME

FIELD OF THE INVENTION

This invention relates to an iron.antimony-containing metal oxide catalyst composition comprising as essential components iron, antimony, and at least one element selected from the group consisting of vanadium, molybdenum, and tungsten and to a process for producing the same. The catalyst composition of the invention has an activity suitable for use in the oxidation reaction of organic compounds and also has physical properties suitable for use as an industrial catalyst. The term "the oxidation reaction of organic compounds" as used herein refers to all normal oxidation reaction as well as oxidation reactions involving dehydrogenation (oxidative dehydrogenation) and ammoxidation.

BACKGROUND OF THE INVENTION

Catalysts containing iron, antimony, and at least one element selected from the group consisting of vanadium, molybdenum, and tungsten are known to be useful in production of aldehydes by oxidation of organic compounds, production of dienes or alkenylbenzenes by oxidative dehydrogenation of organic compounds, and production of nitriles by ammoxidation of organic compounds. Reference can be made, e.g., in U.S. Pat. Nos. 3,445,521, 3,542,843, 3,546,138, and 3,591,620, JP-B-46-2806 (the term "JP-B" as used herein means an "examined published Japanese patent application"), JP-B-46-2807, U.S. Pat. Nos. 3,668,147, 3,988,359, and 4,083,804, JP-B-54-39839, and JP-A-63-250357 (the term "JP-A" as used herein means an "unexamined published Japanese patent application").

On the other hand, production of antimony-containing oxide catalysts inclusive of those useful in the above-mentioned reactions is associated with problems such as poor reproducibility, poor operability, and difficulty of obtaining high strength catalysts. In view of these problems, there have been proposed several improved processes for producing such catalysts as disclosed, e.g., in U.S. Pat. Nos. 3,341,471, 3,686,138 and 4,049,575, JP-B-46-3456, JP-A-63-190646, and JP-A-3-26342 (corresponding to U.S. Ser. No. 07/540,729 filed on Jun. 20, 1990 and EP 404529A1.

However, conventionally proposed processes for producing an antimony-containing oxide catalyst hardly attain good results when applied as such to production of iron. antimony catalysts having high contents of vanadium, molybdenum and tungsten. For example, the processes disclosed in U.S. Pat. Nos. 3,657,155 and 3,686,138 and JP-A-3-26342 are excellent for producing iron.antimony-based metal oxide catalysts suitable for fluidized bed reactions. However, when the processes are applied to production of catalysts containing relatively large quantities of vanadium, molybdenum, and tungsten as purposed in the present invention, the resulting catalysts hardly meet the demands for activity and physical properties as demonstrated in Test Examples hereinafter described. Further, the process disclosed in JP-A-63-190646 in which catalysts are produced by impregnation requires complicated steps for obtaining catalysts containing large quantities of vanadium, molybdenum, and tungsten, for example, repetition of impregnation and drying using an impregnating solution having a low concentration and is not therefore considered to be fully suitable for practical use.

Since the industrial output of products obtained by the oxidation or ammoxidation of organic compounds is high, a slight increase in yield of the desired products or a slight improvement in the physical properties of the catalyst or catalyst strength gives great commercial and economic effects.

SUMMARY OF THE INVENTION

An object of the present invention is to provide a catalyst containing iron, antimony, and at least one element selected from the group consisting of vanadium, molybdenum, and tungsten which is excellent in both catalyst activity and physical properties and suitable for oxidation (including normal oxidation reactions, oxidative dehydrogenation or ammoxidation) of organic compounds, and particularly for ammoxidation of aromatic hydrocarbons or alcohols.

Another object of the present invention is to provide a process for producing such a catalyst with satisfactory reproducibility and technical advantages.

A first embodiment of the present invention relates to an iron.antimony-containing metal oxide catalyst composition comprising as essential components iron, antimony, and at least one element selected from the group consisting of vanadium, molybdenum, and tungsten which is represented by empirical formula:

$$Fe_aSb_bV_cMo_dW_eQ_fR_gP_hO_i$$

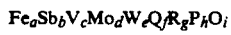

wherein Q represents at least one element selected from the group consisting of Li, Na, K, Rb, Cs, Be, Mg, Ca, Sr, Ba, Sc, Y, La, Ce, Pr, Nd, Sm, Th, U, Ti, Zr, Hf, Nb, Ta, Cr, Mn, Re, Co, Ni, Ru, Rh, Pd, Os, Ir, Pt, Cu, Ag, Au, Zn, Cd, Hg, Al, Ga, In, Tl, Ge, Sn, and Pb, preferably at least one element selected from the group consisting of K, Mg, La, Ce, Ti, Zr, Nb, Cr, Mn, Co, Ni, Pd, Cu, Ag, Zn, and Sn; R represents at least one element selected from the group consisting of B, As, Bi, and Se; and a, b, c, d, e, f, g, h, and i each represent an atomic ratio of the respective element, wherein a is from 5 to 15,
b is from 5 to 100, preferably from 10 to 60,
the sum of c, d, and e is from 3 to 15, preferably from 5 to 13, provided that (i) when the sum of c and e is 0, d/a is more than 1, (ii) when the sum of c and e is not 0, (c+e)/a is more than 0.3,
f is from 0 to 15,
the sum of g and h is from 0 to 10, provided that when h is not 0, (c+d 30 e)/h is more than 1, and
i is a number of oxygen atom as determined corresponding to the oxides formed by combining the above components, said catalyst composition containing a crystalline iron antimonate.

A second embodiment of the present invention relates to a process for producing the above-described iron.antimony-containing metal oxide catalyst composition, which comprises preparing a slurry essentially containing (i) crystalline iron antimonate and (ii) at least one element selected from the group consisting of vanadium, molybdenum, and tungsten or a slurry containing the essential components (i) and (ii), and (iii) at least one element selected from the group consisting of the catalyst components represented by Q, R and P according to the above empirical formula, drying the aqueous slurry, and calcining the dried product.

DETAILED DESCRIPTION OF THE INVENTION

It is essential that the catalyst composition of the present invention should contain Fe, Sb, and at least one of V, Mo, and W in specific ratios as specified by the above empirical formula and contain iron antimonate in a crystal form. Catalyst compositions containing no a crystalline iron antimonate are considerably inferior in catalyst activity and physical properties. If the Fe content is lower than the above-described lower limit, catalyst activity is reduced, while if the Fe content is higher than the upper limit, the selectivity to desired products is reduced. If the Sb content is lower than the above-described lower limit, the selectivity of the desired product is reduced, while if the Sb content is higher than the upper limit, catalyst activity is reduced and physical properties are deteriorated. If the V, Mo or W content is lower than the above-described lower limit, a sufficient reaction rate cannot be obtained, and the selectivity to desired products is reduced. If the V, Mo or W content is larger than the upper limit, the reaction rate increases, but the selectivity to desired products decreases, and physical properties, such as bulk density and strength, are reduced.

Several compounds are known as iron antimonate, including $FeSbO_4$, $FeSb_2O_4$, $FeSb_2O_6$, and $FeSb_5O_{12}$, and $FeSbO_4$, is generally known. The invention includes any known iron antimonate, but the iron antimonate in the catalyst of the present invention preferably includes $FeSbO_4$. X-ray diffractometrical data for $FeSbO_4$ are reported, e.g., in J. Korinth, P. Royen, Z. Anorg. Allg. Chem., 340, 146–157 (1965).

The presence of crystalline iron antimonate in the catalyst system according to the present invention can be confirmed by the X-ray diffractometry. The terminology "crystalline iron antimonate" as used herein means not only pure iron antimonate but also iron antimonate in the form of a solid solution containing various elements dissolved therein. All the Fe and Sb components do not always need to form crystalline iron antimonate. That is, a part of the Fe and Sb components may be present in the free form or in the form other compounds.

While it has not yet been clarified in what form vanadium, molybdenum, and tungsten are present in the catalyst of the present invention, most of them appear to be in the form of solid solution dissolved in the iron antimonate crystal.

Optional components other than iron, antimony, vanadium, molybdenum, and tungsten can be appropriately selected so as to adjust the selectivity of the desired product, the reaction rate, the physical properties of the catalyst, and the like. For example, the addition of Q component contributes to improvement of the physical properties of the catalyst, adjustment of the reaction rate, and control of by-products, and the addition of R or P components to improvement of the selectivity of the desired product.

The catalyst of the present invention may be used without a carrier, but is preferably used as being supported on an appropriate carrier. A suitable carrier component is silica. In addition, alumina, silica-alumina, titania, silicatitania, and zirconia are also useful.

The catalyst of the present invention can be produced by preparing a slurry, preferably aqueous slurry, containing crystalline iron antimonate, at least one component selected from the group consisting of vanadium, molybdenum and tungsten, and optionally at least one component selected from the group consisting of the Q component, R component and P component, drying the slurry and calcining the resulting dried material.

Iron antimonate can be prepared by reacting an iron compound and an antimony compound with each other as such or in an aqueous slurry. More specifically, iron antimonate is obtained by a process comprising sufficiently mixing an iron compound, e.g., iron oxide and iron nitrate, and an antimony compound, e.g., antimony oxide and antimonic acid, and calcining the mixture; or a process comprising mixing and heating iron nitrate and antimony oxide or antimonic acid in an aqueous slurry and then drying the slurry, if necessary, followed by calcination.

When the iron antimonate is prepared in the slurry state, the aqueous slurry containing an iron compound such as iron nitrate and an antimony compound such as antimony trioxide is heat-treated. The heat-treatment is preferably carried out with uniformly mixing the slurry while retaining the form of the slurry. The heating temperature is in the range of from about 40° to about 150° C., and preferably of from about 80° to about 100° C. for from about 10 minutes to 50 hours. It is preferred that the slurry be adjusted to pH of about 7 or less, and preferably between about 1 and about 4, prior to the heat treatment. When, in particular, a fluidized bed catalyst is desired, it is preferable to use silica as a carrier and to add silica sol as a silica source to the slurry before heating.

The calcination in the preparation of iron antimonate is suitably conducted at a temperature of from 300° to 1200° C., and preferably from 500 to 1000° C., for a period of from 0.5 to 50 hours.

Examples of useful iron compounds include oxides, e.g., ferrous oxide, ferric oxide, and tri-iron tetroxide; iron salts of inorganic acid, e.g., ferrous chloride, ferric chloride, ferric nitrate, and iron carbonate; and iron salts of organic acid, e.g., iron oxalate and iron citrate. Further, elemental iron can be also used as a raw material for the iron component.

Examples of useful antimony compounds include antimony trioxide, antimony tetroxide, antimony pentoxide, antimonic acid, polyantimonic acid, sodium antimonate, potassium antimonate, antimony trichloride, and antimony pentachloride.

It can be easily confirmed by way of X-ray diffractometry whether the crystalline iron antimonate is formed or not.

The thus obtained crystalline iron antimonate is mixed with raw materials for V, Mo, and W components and, if desired, raw materials for Q, R, P, and carrier components.

Examples of useful raw materials for the vanadium component are ammonium metavanadate, vanadyl sulfate, vanadyl oxalate, vanadium pentoxide, and a peroxyvanadium ion.

Examples of useful raw materials for the molybdenum component are molybdenum trioxide; molybdic acid; molybdates, e.g., ammonium paramolybdate and ammonium metamolybdate; and heteropoly-acids or salts thereof, e.g., phosphomolybdic acid.

Examples of useful raw materials for the tungsten component include tungsten trioxide; tungstic acid; tungstates, e.g., ammonium paratungstate and ammonium metatungstate; and heteropoly-acids or salts thereof, e.g., phosphotungstic acid.

Examples of useful raw materials for Q, R, and P components include oxides, hydroxides, nitrates, carbonates, organic acid salts, etc. of the respective element.

Where silica is employed as a carrier, silica sol is advantageously used as a raw material. A part or the whole of silica sol may be replaced with white carbon, fumed silica, silica hydrogel, etc.

The raw materials for Q, R, P, and carrier components may be added to the reaction system for preparing crystalline iron antimonate as long as such addition may not interfere with the reaction between an iron compound and an antimony compound for production of iron antimonate. In any case, the aqueous slurry before drying must contain crystalline iron antimonate and a compound of at least one element selected from vanadium, molybdenum, and tungsten. Otherwise, the resulting catalyst has reduced activity and physical properties.

Subsequently, the thus prepared slurry is dried and then calcined to obtain the catalyst of the present invention. The calcination is usually performed in air at a temperature of from about 200° to about 950° C., and preferably from about 400° to about 900° C. The calcination time is subject to variation, depending on the temperature selected. It is generally within 24 hours. The calcination temperature being properly set, a period of from about 0.5 to about 10 hours would be sufficient.

The catalyst according to the present invention can be used either in a fixed bed or in a fluidized bed, preferably in a fluidized bed.

A fixed bed catalyst is produced by drying the above-described aqueous slurry containing the crystalline iron antimonate, the raw materials for V, Mo, and W components, and, if desired, the raw materials for Q, R, P, and carrier components, or drying the slurry followed by calcination, and molding the dried material or calcined material by means of pelletizing or extrusion.

A fluidized bed catalyst is preferably produced by spray drying the above-described aqueous slurry to obtain fine spherical particles. The spray drying can be effected by means of any conventional spray drier, e.g., a rotary disk type, a high-pressure nozzle type, or a two-fluid nozzle type drier. For calcining, a fluidized bed calcining furnace can be used.

The catalyst production process according to the present invention is particularly suitable for use in the production of the fluidized bed catalysts, and a catalyst having excellent activity and high strength can be obtained with satisfactory reproducibility.

The catalysts produced by the process of the present invention are useful for conventional reactions such as the oxidation, oxidative dehydrogenation and ammoxidation of organic compounds as stated above. Usage of the catalysts is in accordance with any known methods. For example, a mixed gas comprising a starting organic compound, oxygen, and optionally ammonia in a molar ratio of organic compound:oxygen:ammonia = 1:0.5 to 10:0 to 5 is passed through a reactor packed with the catalyst at a temperature ranging from 200° to 600° C.

The reactions may be carried out in the fixed-bed or fluidized bed, but the fluidized bed reaction is preferable.

The catalyst according to the present invention exhibits excellent performance particularly in oxidation, oxidative dehydrogenation or ammoxidation of organic compounds such as alkyl aromatic hydrocarbons, alkyl heteroaromatic hydrocarbons, saturated or unsaturated aliphatic hydrocarbons, alcohols, and carbonyl compounds. Particularly, the catalyst of the present invention is suitable for use in the oxidation or ammoxidation of alkyl aromatic hydrocarbons, alkyl heteroaromatic hydrocarbons, and alcohols.

Suitable alkyl aromatic hydrocarbons include toluene, xylene, mesitylene, methylnaphthalene, ethylbenzene, halogenated toluene, methoxytoluene, and cumene. Suitable alkyl heteroaromaic hydrocarbons include picoline, lutidine, collidine, methylpyrazine, and ethylpyridine. Suitable saturated aliphatic hydrocarbons include n-butane and isobutane. Suitable unsaturated aliphatic hydrocarbons include propylene, n-butylene, isobutylene, butadiene, and isoprene. Suitable alcohols include methanol, ethanol, isopropanol, and ethylene glycol. Examples of suitable carbonyl compounds include acetone, methyl ethyl ketone, formaldehyde, acetaldehyde, isobutylaldehyde, acrolein, and methacrolein.

In cases where conventional processes are followed for preparation of iron.antimony-containing metal oxide catalysts having a high vanadium, molybdenum or tungsten content, as mentioned hereinbefore, it is generally difficult to obtain catalysts of sufficient strength and, in particular, the production reproducibility is so poor that changes of calcining temperature cause considerable variations of activity and physical properties of the resulting catalyst. To the contrary, the process according to the present invention provides catalysts satisfying both activity and physical properties with good reproducibility.

The present invention is now illustrated in greater detail with reference to Examples, but it should be understood that the present invention is not construed as being limited thereto. All the percents are by weight unless otherwise indicated.

EXAMPLE 1

A catalyst having an empirical formula:

$Fe_{11}Sb_{20}V_8Mo_1W_{0.5}O_{81}(SiO_2)_5$ was prepared as follows.

(I) 239.3 g of antimony trioxide powder was weighed.

(II) 390 ml of nitric acid (specific gravity: 1.38) and 490 ml of water were mixed and heated at 40° C. To the mixture was added 50.3 g of electrolytic iron powder portionwise to dissolve it.

(III) 1229 g of silica sol ($SiO_2$: 20 wt %) was weighed.

Components (III) and (I) were added in this order to component (II) while stirring well, and the pH of the slurry was adjusted to 2 with 15% aqueous ammonia.

The resulting slurry was heat treated at 100° C. for 3 hours with stirring.

X-ray diffractometry of the solids content of the slurry revealed formation of crystalline iron antimonate.

(IV) 14.5 g of ammonium paramolybdate was weighed and dissolved in 60 ml of pure water.

(V) 80.1 g of ammonium metavanadate was added to 480 ml of pure water, followed by heating at 40° C., and 160 g of oxalic acid was portionewise added thereto to dissolve it.

(VI) 19.0 g of an ammonium metatungstate aqueous solution ($WO_3$: 50 wt %) was weighed.

Components (IV), (V), and (VI) were added to the above-prepared aqueous slurry containing crystalline iron antimonate, followed by thoroughly stirring.

The resulting aqueous slurry was spray dried by means of a rotary disk type spray drier. The resulting fine spherical particles were calcined at 200° C. for 2 hours, then at 400° C. for 3 hours, and finally at 500° C. for 1 hour.

EXAMPLE 2

A catalyst having an empirical formula:

$Fe_9Sb_{25}V_{10}W_1Ni_5O_{96.5}(SiO_2)_{60}$ was prepared in the same manner as in Example 1, except that addition of antimony trioxide was followed by addition of a solution of nickel nitrate in pure water as a nickel raw material and the final calcination was conducted at 600° C. for 2 hours.

EXAMPLE 3

A catalyst having an empirical formula:

$Fe_{11}Sb_{18}V_5Mo_{1.5}W_{0.5}Bi_1O_{72.5}(SiO_2)_{50}$ was prepared in the same manner as in Example 1, except that addition of antimony trioxide was followed by addition of a suspension of bismuth nitrate in pure water as a bismuth raw material and the final calcination was conducted at 800° C. for 3 hours.

EXAMPLE 4

A catalyst having an empirical formula:

$Fe_{14}Sb_{32}V_{12}Mo_1Mg_3O_{121}(SiO_2)_{80}$ was prepared in the same manner as in Example 1, except that addition of antimony trioxide was followed by addition of a solution of magnesium nitrate in pure water as a magnesium raw material and the final calcination was conducted at 700° C. for 3 hours.

EXAMPLE 5

A catalyst having an empirical formula:

$Fe_{13}Sb_{50}V_2Mo_{11}W_2Cu_4Zn_2B_{0.5}O_{166.3}(SiO_2)_{100}$ was prepared in the same manner as in Example 1, except that addition of antimony trioxide was followed by addition of a copper nitrate solution in pure water, a zinc nitrate solution in pure water, and a boric acid solution in pure water as Cu, Zn, and B raw materials, respectively, and the final calcination was conducted at 600° C. for 3 hours.

EXAMPLE 6

A catalyst having an empirical formula:

$Fe_{13}Sb_{28}Mo_3W_8O_{108.5}(SiO_2)_{70}$ was prepared in the same manner as in Example 1, except that the final calcination was conducted at 800° C. for 3 hours.

EXAMPLE 7

A catalyst having an empirical formula:

$Fe_{13}Sb_{20}V_{0.5}Mo_{0.2}W_{11}O_{94.3}(SiO_2)_{60}$ was prepared in the same manner as in Example 1, except that the final calcination was conducted at 820° C. for 2 hours.

COMPARATIVE EXAMPLE 1

A catalyst having the same empirical formula as in Example 1 was prepared as follows.

(I) 239.3 g of antimony trioxide powder was weighed.

(II) 390 ml of nitric acid (specific gravity: 1.38) and 490 ml of water were mixed and heated at 40° C. To the mixture was added 50.3 g of electrolytic iron powder portionwise to dissolve it.

(III) 1229.3 g of silica sol (SiO$_2$: 20 wt %) was weighed.

(IV) 14.5 g of ammonium paramolybdate was weighed and dissolved in 60 ml of pure water.

(V) 80.1 g of ammonium metavanadate was added to 480 ml of pure water, followed by heating at 40° C., and 160 g of oxalic acid was portionwise added thereto to dissolve it.

(VI) 19.0 g of an ammonium metatungstate aqueous solution (WO$_3$: 50 wt %) was weighed.

Components (III), (IV), (V), (VI), and (I) were added in this order to component (II), followed by thoroughly stirring. The resulting slurry was heat treated at 100° C. for 3 hours with stirring.

X-ray diffractometry of the solids content of the slurry revealed no formation of crystalline iron antimonate.

The aqueous slurry was spray dried by means of a rotary disk type spray drier. The resulting fine spherical particles were calcined at 200° C. for 2 hours, then at 400° C. for 3 hours, and finally at 500° C. for 1 hour.

COMPARATIVE EXAMPLE 2

A catalyst having the same composition as in Example 1 was prepared in the same manner as in Example 1, except for using iron trioxide as an Fe raw material.

COMPARATIVE EXAMPLE 3

A catalyst having an empirical formula:

$Fe_{11}Sb_{18}V_{12}Mo_{13}W_9Bi_1O_{150}(SiO_2)_{50}$ (having higher V, Mo and W contents than in the catalyst of Example 3) was prepared in the same manner as in Example 3.

COMPARATIVE EXAMPLE 4

A catalyst having an empirical formula:

$Fe_{11}Sb_{18}V_{0.5}Mo_1W_{0.5}Bi_1O_{59.7}(SiO_2)_{50}$ (having lower V, Mo and W contents than in the catalyst of Example 3) was prepared in the same manner as in Example 3.

Activity and physical properties of each of the catalysts prepared in the foregoing Examples and Comparative Examples are shown in Table 1 below together with the empirical formula, conditions for activity test, etc.

Tests for activity and attrition resistance of the catalysts were performed in accordance with the following methods.

1) Activity Test

The sample catalyst was packed into a fluidized bed reactor having a fluidized zone of 2.5 cm in inner diameter and 40 cm in height. Ammoxidation of toluene or methanol was carried out in the reactor under conditions described below. Catalyst activity was evaluated from the reaction yield, conversion, and selectivity obtained from equations shown below.

(i) Ammoxidation of Toluene
  Pressure: normal pressure
  Temperature and contact time: see Table 1
  Oxygen (supplied as air)/toluene molar ratio: 5.0
  Ammonia/toluene molar ratio: 3.0
(ii) Ammoxidation of Methanol
  Pressure: normal pressure
  Temperature and contact time: see Table 1
  Oxygen (supplied as air)/methanol molar ratio: 4.3
  Ammonia/methanol molar ratio: 1.1

$$\text{Conversion (\%)} = \frac{\text{Weight (g) of carbon in starting compound consumed by reaction}}{\text{Weight (g) of carbon in starting compound fed}} \times 100$$

$$\text{Yield (\%)} = \frac{\text{Weight (g) of carbon in desired product formed}}{\text{Weight (g) of carbon in starting compound fed}} \times 100$$

$$\text{Selectivity (\%)} = \frac{\text{Weight (g) of carbon in desired product formed}}{\text{Weight (g) of carbon in starting compound consumed by reaction}} \times 100$$

2) Attrition Test

The test was carried out according to the method described in "Test Methods for Synthetic Cracking Catalysts", American Cyanamid Co., Ltd., 6/31-4m-1/57, a well known test methods for fluid catalytic cracking catalysts. An attrition loss (%) R was determined by the following equation:

$$\text{Attrition loss (\%) } R = \frac{B}{C - A} \times 100$$

wherein A is a weight (g) of a catalyst lost by attrition during a period of the first 5 hours; B is a weight (g) of a catalyst lost by attrition for 5 to 25 hours; and C is a weight (g) of a catalyst fed to test. The test was conducted with C=50 g.

The higher the attrition resistance of the catalyst, that is, the higher the strength of the catalyst, the smaller the value of attrition loss (%) R.

TABLE 1

| Example No. | Empirical Formula | Final Calcining Temp. (°C.) | Apparent Bulk Density (g/ml) | Iron Antimonate in catalyst | Reaction Temp. (°C.) | Contact Time (sec) | Conversion (%) | Yield (%) | Selectivity (%) | Attrition Loss (%) |
|---|---|---|---|---|---|---|---|---|---|---|
| Example 1 | $Fe_{11}Sb_{20}V_8Mo_1W_{0.5}O_{81}(SiO_2)_{50}$ | 500 | 0.95 | present | 380 | 2.0 | $TN^{1)}$ 98.7 | $BN^{2)}$ 75.9 | BN 76.9 | 1.3 |
| Example 2 | $Fe_9Sb_{25}V_{10}W_1Ni_5O_{96.5}(SiO_2)_{60}$ | 600 | 0.99 | " | 400 | 1.5 | TN 97.6 | BN 75.3 | BN 77.2 | 1.3 |
| Example 3 | $Fe_{11}Sb_{18}V_5Mo_{1.5}W_{0.5}Bi_1O_{72.5}(SiO_2)_{50}$ | 800 | 1.08 | " | 430 | 2.5 | TN 97.7 | BN 82.1 | BN 84.0 | 0.6 |
| Example 4 | $Fe_{14}Sb_{32}V_{12}Mo_1Mg_3O_{121}(SiO_2)_{80}$ | 700 | 0.98 | " | 410 | 1.5 | TN 98.2 | BN 76.6 | BN 78.0 | 0.8 |
| Example 5 | $Fe_{13}Sb_{50}V_2Mo_{11}W_2Cu_4Zn_2B_{0.5}O_{166.3}(SiO_2)_{100}$ | 600 | 0.96 | " | 450 | 3.5 | TN 98.5 | BN 65.2 | BN 66.2 | 1.2 |
| Example 6 | $Fe_{13}Sb_{28}Mo_3W_8O_{108.5}(SiO_2)_{70}$ | 800 | 1.10 | " | 470 | 4.0 | TN 96.0 | BN 62.8 | BN 65.4 | 0.9 |
| Example 7 | $Fe_{13}Sb_{20}V_{0.5}Mo_{0.2}W_{11}O_{94.3}(SiO_2)_{60}$ | 820 | 1.07 | " | 460 | 1.5 | $ME^{3)}$ 99.3 | $CY^{4)}$ 89.1 | CY 89.7 | 1.0 |
| Comp. Example 1 | $Fe_{11}Sb_{20}V_8Mo_1W_{0.5}O_{81}(SiO_2)_{50}$ | 500 | 0.70 | absent | 380 | 2.0 | TN 97.2 | BN 57.1 | BN 58.7 | 4.7 |
| Comp. Example 2 | $Fe_{11}Sb_{20}V_8Mo_1W_{0.5}O_{81}(SiO_2)_{50}$ | 500 | 0.73 | " | 380 | 2.0 | TN 95.2 | BN 50.6 | BN 53.2 | 5.2 |
| Comp. Example 3 | $Fe_{11}Sb_{18}V_{12}Mo_{13}W_9Bi_1O_{150}(SiO_2)_{50}$ | 800 | 0.77 | present | 430 | 2.5 | TN 100 | BN 58.3 | BN 58.3 | 3.8 |
| Comp. Example 4 | $Fe_{11}Sb_{18}V_{0.5}Mo_1W_{0.5}Bi_1O_{59.7}(SiO_2)_{50}$ | 800 | 1.07 | " | 430 | 2.5 | TN 35.6 | BN 18.5 | BN 52.0 | 0.9 |

Note:
[1] Toluene
[2] Benzonitrile
[3] Methanol
[4] Hydrogen cyanide

It is apparent from the results in. Table 1 that the catalysts according to the present invention (Examples 1 to 7) exhibit superior performance over those of Comparative Examples 1 to 4.

The catalysts of Comparative Examples 1 and 2, though having a composition falling within the range of the present invention, do not contain crystalline iron antimonate and are not therefore in accordance with the present invention. The catalysts of Comparative Examples 3 and 4 are examples in which the V, Mo, and W contents are out of the respective ranges specified in the present invention.

The results of Table 1 prove that the catalysts of the present invention achieve satisfactory reaction results in ammoxidation of not only toluene but also methanol.

While the invention has been described in detail and with reference to specific examples thereof, it will be apparent to one skilled in the art that various changes and modifications can be made therein without departing from the spirit and scope thereof.

What is claimed is:

1. An iron.antimony-containing metal oxide catalyst composition consisting essentially of iron, antimony, and at least one element selected from the group consisting of vanadium, molybdenum, and tungsten which is represented by empirical formula:

wherein Q represents at least one element selected from the group consisting of Li, Na, K, Rb, Cs, Be, Mg, Ca, Sr, Ba, Sc, Y, La, Ce, Pr, Nd, Sm, Th, U, Ti, Zr, Hf, Nb, Ta, Cr, Mn, Re, Co, Ni, Ru, Rh, Pd, Os, Ir, Pt, Cu, Ag, Au, Zn, Cd, Hg, Al, Ga, In, Tl, Ge, Sn, and Pb; R represents at least one element selected from the group consisting of B, As, Bi, and Se; and a, b, c, d, e, f, g, h, and i each represent an atomic ratio of the respective element, wherein a is from 5 to 15,
b is from 5 to 100,
the sum of c, d, and e is from 3 to 15, provided that (i) when the sum of c and e is 0, d/a is more than 1, (ii) when the sum of c and e is not 0, (c +e)/a is more than 0.3,
f is from 0 to 15,
the sum of g and h is from 0 to 10, provided that when h is not 0, (c +d +e)/h is more than 1, and
i is a number of oxygen atom as determined corresponding to the oxides formed by combining the above components, said catalyst composition containing a crystalline iron antimonate.

2. A catalyst composition as claimed in claim 1, wherein component Q is at least one element selected from the group consisting of K, Mg, La, Ce, Ti, Zr, Nb, Cr, Mn, Co, Ni, Pd, Cu, Ag, Zn, and Sn.

3. A catalyst composition as claimed in claim 1, wherein a is from 5 to 15, b is from 10 to 60; the sum of c, d, and e is from 5 to 13.

4. A catalyst composition as claimed in claim 1, wherein said catalyst composition is supported on a carrier.

5. A process for producing an iron.antimony-containing metal oxide catalyst composition consisting essentially of iron, antimony, and at least one element selected from the group consisting of vanadium, molybdenum, and tungsten which is represented by empirical formula:

wherein Q represents at least one element selected from the group consisting of Li, Na, K, Rb, Cs, Be, Mg, Ca, Sr, Ba, Sc, Y, La, Ce, Pr, Nd, Sm, Th, U, Ti, Zr, Hf, Nb, Ta, Cr, Mn, Re, Co, Ni, Ru, Rh, Pd, Os, Ir, Pt, Cu, Ag, Au, Zn, Cd, Hg, Al, Ga, In, Tl, Ge, Sn, and Pb; R represents at least one element selected from the group consisting of B, As, Bi, and Se; and a, b, c, d, e, f, g, h, and i each represent an atomic ratio of the respective element, wherein a is from 5 to 15,
b is from 5 to 100,
the sum of c, d, and e is from 3 to 15, provided that (i) when the sum of c and e is 0, d/a is more than 1, (ii) when the sum of c and e is not 0, (c +e)/a is more than 0.3,
f is from 0 to 15,
the sum of g and h is from 0 to 10, provided that when h is not 0, (c +d +e)/h is more than 1, and
i is a number of oxgen atom as determined corresponding to the oxides formed by combining the above components, said catalyst composition containing a crystalline iron antimonate, which comprises the steps of:

(a) preparing a slurry essentially containing (i) crystalline iron antimonate and (ii) at least one element selected from the group consisting of vanadium, molybdenum, and tungsten or a slurry containing essential components (i) and (ii), and (iii) at least one element selected from the group consisting of the catalyst components represented by Q, R and P;

(b) drying said aqueous slurry; and (c) calcining said dried material to provide said metal oxide catalyst.

6. A process as claimed in claim 5, wherein said iron antimonate is iron antimonate prepared by calcining a mixture of an iron compound and an antimony compound in air.

7. A process as claimed in claim 5, wherein said iron antimonate is iron antimonate prepared by heating an aqueous slurry containing an iron compound and an antimony compound while retaining the form of the slurry.

8. A process as claimed in claim 5, wherein said drying of the aqueous slurry is carried out by spray drying.

9. A process as claimed in claim 5, wherein said calcining of the dried material is carried out at a temperature of from about 200° to about 950° C.

10. A catalyst composition as claimed in claim 1, wherein said catalyst composition is suitable for use in the oxidation or ammoxidation of alkyl aromatic hydrocarbons, alkyl heteroaromatic hydrocarbons and alcohols.

11. A process as claimed in claim 5, wherein said catalyst composition is suitable for use in the oxidation or ammoxidation of alkyl aromatic hydrocarbons, alkyl heteroaromatic hydrocarbons and alcohols.

* * * * *